(12) United States Patent
Cowan et al.

(10) Patent No.: US 7,544,785 B2
(45) Date of Patent: Jun. 9, 2009

(54) PROCESS FOR THE TREATMENT FOR CHITINACEOUS MATERIALS AND FOR THE DEACETYLATION OF CHITIN

(75) Inventors: Jack C. Cowan, Lafayette, LA (US); Andre' N. Blanchard, Broussard, LA (US); Catherine G. Benoit, Broussard, LA (US); Tammy L. Rodrigue, St. Martinville, LA (US)

(73) Assignee: Venture Chemicals, Inc., Lafayette, LA (US)

( * ) Notice: Subject to any disclaimer, the term of this patent is extended or adjusted under 35 U.S.C. 154(b) by 648 days.

(21) Appl. No.: 10/554,489

(22) PCT Filed: May 24, 2004

(86) PCT No.: PCT/US2004/016284

§ 371 (c)(1),
(2), (4) Date: Oct. 24, 2005

(87) PCT Pub. No.: WO2004/111188

PCT Pub. Date: Dec. 23, 2004

(65) Prior Publication Data

US 2006/0205932 A1    Sep. 14, 2006

(51) Int. Cl.
| C08B 37/08 | (2006.01) |
| C07H 5/04 | (2006.01) |
| C07H 5/06 | (2006.01) |
| C07H 3/00 | (2006.01) |

(52) U.S. Cl. .................. 536/20; 536/55.3; 536/124

(58) Field of Classification Search .................. None
See application file for complete search history.

(56) References Cited

U.S. PATENT DOCUMENTS

| 4,619,995 | A * | 10/1986 | Hayes ............... 536/20 |
| 6,458,938 | B1 * | 10/2002 | Cha et al. ............... 536/20 |
| 6,972,284 | B2 * | 12/2005 | Fan et al. ............... 514/55 |
| 2004/0215005 | A1 * | 10/2004 | Varum et al. ............... 536/20 |

\* cited by examiner

*Primary Examiner*—Traviss C McIntosh, III
(74) *Attorney, Agent, or Firm*—Roy F. House

(57) ABSTRACT

Disclosed is a process for the deacetylation of chitin and a process for the treatment of chitinaceous materials to obtain chitin which processes are conducted in a non-saponifiable, non-aqueous, water insoluble liquid having a flash point greater than about 100° C., preferably a non-aromatic hydrocarbon. The process for the deacetylation of chitin comprises suspending chitin in the hydrocarbon liquid, preferably from about 0.02 g/cc to about 0.2 g/cc, mixing therewith an alkali metal hydroxide solution, and heating the suspension at a temperature at least about 70° C. for a period of time sufficient to obtain the desired degree of deacetylation. The concentration of alkali metal hydroxide in the alkali metal hydroxide solution is at least 30% by weight, preferably at least 40% by weight, and most preferably at least 50% by weight, and the quantity of alkali metal hydroxide is sufficient to provide an alkali metal hydroxide to chitin weight ratio from about (0.35)(AMHMW)/40 to about (2.5)(AMHMW)/, 40 where AMHMW is the molecular weight of the alkali metal hydroxide.

13 Claims, No Drawings

PROCESS FOR THE TREATMENT FOR CHITINACEOUS MATERIALS AND FOR THE DEACETYLATION OF CHITIN

The present invention relates to a process for obtaining chitin from chitinaceous materials and/or for the deacetylation of chitin.

BACKGROUND OF TH INVENTION

Chitin, the second most abundant natural biopolymer (after cellulose), is a significant structural component in the shells of crustaceans (e.g., crabs, lobster and shrimp), in the exoskeletons of insects and in the cell walls of many microbes and higher fungi. Chitin is a polysaccharide consisting predominantly of unbranched chains of β-(1,4)-2-acetamido-2-deoxy-D-glucose (also known as N-acetyl-D-glucosamine) residues. It may also be regarded as a derivative of cellulose, in which the C-2 hydroxyl groups have been replaced by acetamide residues, and it resembles cellulose in many of its properties. Its occurrence in nature and its isolation are well documented.

Chitin is an amorphous solid which is practically insoluble in water, dilute acids, dilute and concentrated alkalies, alcohol and other organic solvents. It is soluble in concentrated HCl, $H_2SO_4$, 78-97% $H_3PO_4$, and anhydrous HCOOH.

In the U.S. and most other countries, chitin is a greatly underutilized resource and even a significant waste problem for the shellfish industries. The amount of chitin potentially available from seafood wastes in the U.S. was estimated at between 5000 to 8000 tons per year by Hattis and Murray (Industrial Prospects for Chitin From Seafood Wastes, MIT Seagrant Report No. 27, MIT, Cambridge, Mass., August 1976).

Chitin is obtained or isolated from chitinaceous materials such as the shells of crustaceans by removing the associated minerals, principally calcium carbonate, and proteins from the chitinaceous material. The minerals are typically removed by reacting the chitinaceous material with an acid, generally hydrochloric acid, which produces a water soluble chloride by-product. The proteins are typically removed by reacting the chitinaceous material with a base, generally sodium hydroxide.

It has been recognized that chitosan formed by deacetylating chitin has interesting and potentially useful properties. Although chitins may occur in nature in a slightly de-acetylated form, that which has been purposely de-acetylated is usually called chitosan.

Chitosan is not a single, definite chemical entity, but varies in composition depending on conditions of manufacture. It may be equally defined as chitin sufficiently deacetylated to form soluble amine salts.

Solutions of chitosan may be highly viscous, resembling those of natural gums. The cationic properties of the polymer lead to formation of complexes with anionic polyelectrolytes such as carboxymethyl cellulose, and the reactivity of the amino group permits formation of stable gels with a variety of cross-linking agents. Many potential uses for chitosan have been developed, including flocculating agents for water and waste treatment, an additive for drilling fluids, a chelating agent for removal of traces of heavy metals from aqueous solutions, coating to improve dyeing characteristics of glass fibers, wet strength additives for paper, adhesives, photographic and printing applications, thickeners, formation of fibers and films, and many others. Other uses and processes are described in U.S. Pat. Nos. 3,862,122; 3,922,260; 4,018,678; 4,195,175; 5,010,181; and 6,310,188. Commercial development of chitosan has, however, been hampered by the cost of manufacture.

Chitosan was first described by E. Gilson (Berichte 28 821 (1895); Bull (3) 11 1099 (1894)) as prepared by heating chitin with concentrated potassium hydroxide at 180° C., or by fusion with solid potassium hydroxide. Later investigators, notably Rigby (U.S. Pat. No. 2,040,879, May 1, 1936), used alkali hydroxide, usually sodium hydroxide in concentrations from 30 to 60 percent by weight and temperatures from 80° to 160° C., to produce deacetylated chitin products ranging from 20 percent to complete deacetylation. In general, reaction times necessary to obtain soluble products, i.e., chitosan, were found to vary inversely with alkali concentration and temperature, but no consistent correlation of these variables seems to have been developed. In all cases, the ratio of sodium hydroxide solution to chitin used in deacetylation has been high, amounting to three or more parts of alkali hydroxide on a 100 percent basis per part of chitin. Agitation of the chitin-alkali mixture during reaction has also been considered necessary to obtain uniformity of product, and exclusion of air has been found necessary to minimize degradation.

The combination of high alkali concentration, high ratios of alkali solution to chitin treated, high reaction temperature, and agitation during reaction results in high cost for the conversion of chitin to chitosan. High temperature and high alkali concentration require corrosion resistant apparatus, generally all nickel or nickel lined, adding greatly to equipment costs. High ratios of alkali liquid to chitin increase equipment sizes for equal chitosan production and added chemical costs.

U.S. Pat. No. 4,195,175 discloses the process for the deacetylation of ground chitin to yield a soluble chitosan product, that comprises kneading the ground chitin with substantially 2 to 7 parts of substantially 35 to 50 percent sodium hydroxide solution, heating the resulting mixture to substantially 40° C. to 80° C., packing the mixture in containers to expel entrapped air, sealing the containers and displacing residual air with nitrogen, holding the mixture in a quiescent state at substantially 40° C. to 80° C. for from substantially 160 to 40 hours, removing the alkali solution, and washing and drying the resulting chitosan product.

U.S. Pat. No. 4,619,995 discloses that chitosan can be prepared by (a) dispersing chitin in a liquid medium of the group consisting of isopropyl alcohol, n-butanol, isobutanol, methyl ethyl ketone, toluene, and ethanol-toluene mixtures containing at least 72 mole percent toluene, (b) slowly adding a strong aqueous sodium hydroxide solution to the stirred slurry over a period of 10 to 30 minutes and in a proportion to provide substantially five to nine mols sodium hydroxide per mole N-acetyl glucosamine units in the chitin (about 0.98 to about 1.75 g sodium hydroxide per g chitin), (c) heating the stirred slurry to a temperature in the range of 75° C. to 100° C. and maintaining this range for a period of 2.5 to 3.5 hours, and (d) allowing the slurry to cool to ambient room temperature and to steep the chitosan in the caustic medium for a brief period, typically 0.5 to 1.0 hours. The liquid medium is chosen such that the chitosan produced is swollen by the sodium hydroxide.

U.S. Pat. No. 4,574,150 discloses a process for the manufacture of a dry, free-flowing, water soluble carboxylic acid complex of chitosan which includes the step of combining one part of chitosan with from 0.5 to about 30 parts by weight of a liquid selected from the groups consisting of alkanes containing about five to about nine carbon atoms, monoketones, monoesters, mono- and di-ethers, mononitriles, mononitroalkanes containing two to four carbon atoms, normally liquid mono-, poly-chloroalkanes, and alkenes containing one to two carbon atoms.

SUMMARY OF THE INVENTION

The invention provides processes for obtaining chitin from chitinaceous (chitin-containing) materials and/or for the deacetylation of chitin wherein the deacetylation is conducted in a non-aqueous, non-saponifiable, water insoluble liquid in which the chitin and de-acetylated chitin are not soluble, preferably an oleaginous liquid. It is a feature of this invention that the quantity of alkali metal hydroxide required to effect the deacetylation is less than the quantity known to be used in commercial practice.

The process for obtaining chitin from chitinaceous materials comprises suspending the ground chitinaceous material in a non-saponifiable, non-aqueous, water insoluble liquid having a flash point greater than about 100° C. (212° F.) (hereinafter sometimes referred to as "NSNAL"), adding an acid, preferably an acid which produces a water soluble salt by-product, most preferably hydrochloric acid, and reacting the acid with the chitinaceous material at a temperature sufficient to effect the demineralization of the chitinaceous material, adding an alkali metal hydroxide in an amount sufficient to neutralize the acid and produce an alkaline mixture of the demineralized chitinaceous material, heating the mixture-containing the NSNAL to a temperature and for a time period sufficient to deproteinate the demineralized chitinaceous material, and removing the chitin from the NSNAL and water soluble by-products. Alternatively, the chitin can be deacetylated in-situ by suitable adjustment of the concentration of alkali metal hydroxide, time and temperature to obtain the deacetylated chitin as disclosed hereinafter.

The process for the deacetylation of chitin comprises suspending the ground chitin in a NSNAL, adding an alkali metal hydroxide and water (or an alkali metal hydroxide solution), heating the mixture to a temperature and for a time period sufficient to deacetylate the chitin to the desired degree of deacetylation (hereinafter sometimes referred to as "DDA"), and optionally, removing the deacetylated chitin from the NSNAL, and washing the deacetylated chitin free of water soluble by-products and excess alkali metal hydroxide.

It is an object of this invention to provide a process for the deacetylation of chitin wherein the degree of deacetylation is from about 15% to about 100%, preferably from about 15% to about 95%, most preferably from about 20% to about 90%.

It is another object of this invention to provide a process for the deacetylation of chitin wherein the amount of alkali metal hydroxide is no more than about $[(2.5)(AMHMW) \div 40]$ parts by weight of alkali metal hydroxide per part of chitin where AMHWM is the alkali metal hydroxide molecular weight.

Another object of the invention is to provide an economical process for the deacetylation of chitin.

Still another object of the invention is to provide a process for obtaining chitin from chitinaceous materials.

Yet another object of the invention is to provide a process for obtaining chitin from chitinaceous materials and for deacetylating the chitin.

These and other objects of this invention will be apparent to one skilled in the art upon reading this specification and the appended claims.

While the invention is susceptible to various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

PREFERRED EMBODIMENTS OF THE INVENTION

It is known to deacetylate chitin by reaction of the chitin with a strong alkali metal hydroxide solution to hydrolyze the N-acetyl group to the free amine group and the by-product alkali metal acetates. Since the alkali metal hydroxide solution swells the chitin particles, generally this has been accomplished commercially by reacting the chitin with the strong alkali metal hydroxide solution using excessive quantities of the alkali metal hydroxide solution in order to maintain the mixture in a liquid, mixable state. Upon removal of the deacetylated chitin from the liquid, re-use of the caustic solution generally requires that the caustic solution be treated with additional alkali metal hydroxide to replenish the amount lost in the reaction and eventually to remove the alkali metal acetate unless the solution is disposed of without additional treatment. In addition, since the chitin is maintained in a liquid, mixable state in an excess of the alkali metal hydroxide solution, it absorbs a large quantity of the solution and this absorbed solution is removed with the chitin when it is recovered from the solution. The absorbed caustic solution is then washed from the chitin during purification of the decetylated chitin which results in a caustic solution which has an insufficient concentration of the alkali metal hydroxide for re-use in the deacetylation process. Thus these prior processes are very expensive to conduct.

We have now found that chitin can be deacetylated with a caustic solution while suspended in a non-saponifiable, non-aqueous, water insoluble liquid in which the chitin and the deacetylated chitin are insoluble. The quantity of the alkali metal hydroxide solution (hereinafter sometimes referred to as "AMHS") used is sufficient to allow the chitin to swell in the solution such that the deacetylation can occur without having to add an excessive quantity of the AMHS to maintain the mixture in a liquid, mixable state.

The deacetylation process of the invention comprises (1) mixing chitin and an alkali metal hydroxide solution with a non-aqueous, non-saponifiable, water insoluble liquid, (2) heating the mixture to a temperature of at least 70° C., preferably at least 80° C., and most preferably at least 85° C., for a period of time sufficient to deacetylate the chitin to the DDA desired, (3) and, optionally, removing the deacetylated chitin/AMHS mixture from the free NSNAL, (4) washing the mixture to remove the non-reacted alkali metal hydroxide, alkali metal acetate, and any other water soluble by-products produced; and (5) drying the deacetylated chitin.

The concentration of alkali metal hydroxide in the AMHS is at least 30% by weight, preferably at least 40%, and most preferably at least 50% by weight. A 50% aqueous sodium hydroxide solution is commercially available from sodium hydroxide manufacturers. The concentration of sodium hydroxide can be increased by adding additional sodium hydroxide to the 50% aqueous solution. The separate addition of the alkali metal hydroxide and water to the NSNAL will generate the AMHS in-situ.

The quantity of alkali metal hydroxide must be sufficient to produce the DDA desired for the reaction time and temperature utilized. The rate of deacetylation will increase as the temperature is increased. The DDA increases as the quantity of alkali metal hydroxide increases and as the reaction time increases.

The quantity of alkali metal hydroxide used generally will be sufficient to provide an alkali metal hydroxide to chitin weight ratio from about [(0.35)(AMHMW)÷40] to about [(2.5)(AMHMW)÷40], preferably from about [(0.5)(AMHMW)÷40] to about [(2.5)(AMHMW)÷40]. The preferred alkali metal hydroxide for use in the process of the invention is sodium hydroxide. Other alkali metal hydroxides include potassium hydroxide and lithium hydroxide. Other basic substances such as ammonium hydroxide, calcium hydroxide, and organic bases such as polyethylene amines, pyridine and the like may be utilized as the alkalinity reagent.

The quantity of chitin used in the process of the invention is preferably the maximum amount which can be mixed in the non-aqueous, non-saponifiable liquid after the addition of the AMHS and the chitin. The AMHS will be absorbed by the chitin resulting in a swelling of the chitin. The swollen chitin can become "pasty" and "sticky" if an excessive quantity of the AMHS is utilized. Thus, as the alkali metal hydroxide to chitin weight ratio increases, the maximum concentration of chitin in the non-aqueous, non-saponifiable liquid will decrease. Generally the chitin concentration will range from about 0.02 to about 0.2 grams per cubic centimeter of the non-aqueous, non-saponifiable liquid, i.e., about 2% w/v to about 20% w/v, preferably from about 2% w/v to about 15% w/v.

The reaction time need only be sufficient to produce the desired DDA. Generally a reaction time from about 30 minutes to about 240 minutes will produce a DDA from about 15% to about 95% when the reaction temperature is at least 70° C. and the quantity of alkali metal hydroxide used is sufficient to provide an alkali metal hydroxide to chitin weight ratio in the range from about [(0.35)(AMHMW)÷40] to about [(2.5)(AMHMW)÷40].

The decetylated chitin/AMHS mixture can be removed from the NSNAL by known solid/liquid separation processes, such as filtration, centrifugation, decantation, siphoning, and the like. Preferably the deacetylated chitin/AMHS mixture is screened out of the NSNAL resulting in a deacetylated chitin/AMHS/NSNAL semi-solid mixture which is then mixed with water to remove the remaining free NSNAL from the deacetylated chitin/AMHS mixture. The NSNAL can be recovered by siphoning off the water and added back to the NSNAL removed in the screening step and re-cycled for re-use. The deacetylated chitin is preferably washed free of the alkali metal hydroxide and soluble by-products of the deacetylation reaction, and thereafter preferably dried. The drying step can be eliminated if desired when the deacetylated chitin is to be used in an aqueous medium. Many uses of the deacetylated chitin do not require the complete removal of the NSNAL from the chitin.

Although the process had been described in terms of deacetylating chitin, the process can be applied to de-mineralized natural sources of chitin such as de-mineralized crab, lobster, crayfish and shrimp shells to both de-proteinate and deacetylate the shells in one step.

The non-saponifiable, non-aqueous, water insoluble liquid having a flash point greater than about 100° C. used in the invention may be any such liquid that can be maintained in the liquid state at the temperature at which the deacetylation is conducted. The water solubility should be less than about 3% by weight. The deacetylation reaction temperature should be at least 70° C., preferably at least 80° C., and most preferably at least 85° C. The deacetylation can be undertaken at ambient pressure or in suitable pressurized vessels. In the latter case, the temperature can be greater than the ambient pressure boiling point of the aqueous phase. The higher the temperature, the greater is the rate of the reaction which may enable the concentration of alkali metal hydroxide to be reduced for any desired DDA.

The NSNAL should be water insoluble and have: a low viscosity at the reaction temperature; no reactivity to 50% by weight sodium hydroxide at the reaction temperature; good oxidation stability; low sorption to the deacetylated chitin; and a flash point greater than about 100° C. (212° F.). The NSNAL should be biodegradable and be easily recoverable.

The preferred NSNAL is an oleaginous liquid, most preferably a non-aromatic hydrocarbon or a non-aromatic hydrocarbon derivative which is liquid at the deacetylation reaction temperature, non-saponifiable, and has a flash point greater than about 100° C. (212° F.). Representative hydrocarbons are saturated (paraffinic) hydrocarbons such as n-alkanes and iso-alanes, un-saturated (olefinic) hydrocarbons such as alkenes containing one or more double bonds, and mixtures thereof. Generally the hydrocarbon will contain at least fourteen carbon atoms.

Preferably the NSNAL is a relatively low viscosity hydrocarbon refined from petroleum oil, most preferably primarily paraffinic hydrocarbons. Representative hydrocarbons can be obtained from Conoco Phillips from their Pure Performance Base Oils (70N, 80N, 110N, 225N, and 600N—all 99% minimum saturated hydrocarbons) and ConoPurem™ Process Oils (3P, 4P, 6P, and 12P—all 99% minimum saturated hydrocarbons), from EXPO Chemical Company, Inc. for their HT 100 Paraffinic Process Oil, from Vassa Acetes Y Solvente-Venezeulas S. A. for their Vassa-LP oils (LP-70, LP-90, LP-100, and LP-120), and other petroleum refiners.

Other non-limiting NSNAL which can be used in the process of the invention are: high molecular weight alcohols, especially containing more than about 8 carbon atoms, and other aliphatic hydrocarbon derivatives having the requisite characteristics; polypropylene glycols, propylene glycol ethers, butylene glycol ethers, and the like; and silicone oils.

As indicated hereinbefore, it is another feature of the invention to provide a process for obtaining chitin from chitinaceous materials wherein the chitinaceous material is (1) suspended in a NSNAL, (2) reacted with an acid to remove the minerals associated with the chitinaceous material, preferably an acid which produces a water soluble salt by-product, most preferably hydrochloric acid, and (3) reacted with an alkali metal hydroxide to deproteinate the chitinaceous material, and, preferably, to simultaneously deacetylate the chitin.

The deacetylated chitin (also known as partially acetylated chitosan) can be derivatized with various reagents as is known in the art to produce polymers having various characteristics and utility.

The derivatizing reactions can be carried out either without catalysts or, in the acid pH range, in the presence of acid catalysts (for example acetic acid or hydrochloric acid), or in the alkaline pH range, in the presence of bases (for example alkali metal hydroxides or tertiary amines). When, for example, alkylating reagents are employed, derivatives are preferentially formed on the nitrogen when the process is carried out in a neutral or acid medium, and derivatives are preferentially formed on the oxygen when the process is carried out in an alkaline medium.

The reaction times and temperatures are specific for the product of the particular reagent employed, and largely correspond to the information of the prior art.

The deacetylated chitin derivatives are worked up in a customary manner, for example by filtration or purification, for example in the form of an extraction of the by-products and the reagents which have been used in the reaction and not consumed, and/or the agent in which the reaction had been carried out, or by drying.

The reaction can be carried out with one or more reagent(s), which are employed in combination or, alternatively, in succession. If appropriate, an intermediate isolation can be carried out, for example with filtration, purification and drying. Which process steps are to be selected depends largely on the end products to be prepared and can be determined without difficulty.

Examples of reagents which can be reacted with the deacetylated chitin are, for example, alkylene oxides, such as ethylene oxide, propylene oxide, butylene oxide, glycidol, 1,2-epoxydodecane, 1,2-epoxyhexadecane, glycidyltrimethyl-ammonium chloride, glycidyl ethers (for example glycidyl isopropyl ether), alkyl halides (for example methyl chloride, ethyl chloride or stearyl chloride), acid anhydrides (for example acetic anhydride and succinic anhydride), vinyl compounds (for example methyl vinyl ketone, acrylonitrile), aldehydes (for example acetic aldehyde, nonane aldehyde, glyoxylic acid), reactive halogen compounds (for example sodium chloroacetate, β-chloroethane sulfonate, chlorosulfonic acid or carboxylic acid chlorides), phosphorus pentoxide, cyanamides and compounds which can be grafted by means of free radicals (for example by diallyldimethylammonium chloride or acrylonitrile) in the presence of a free-radical initiator. If multifunctional reagents are employed, the results are crosslinked chitosan derivatives. The reaction with aldehydes is advantageously carried out in the presence of a suitable reducing agent, such as, for example, sodium cyanoborohydride, so that the N-alkyl derivatives are obtained directly.

Such deacetylated chitin derivatives can be used for a very wide range of purposes. They include the following: sludge drainage, applications in drilling fluids, thickener (for example in concrete compositions), auxiliaries in the paper and textile industries, absorbents (for example for water or blood), additives to foodstuffs and feed, manufacture of membranes, films and fibers, coating agents, plastics components, separating agents (for example for separating metal ions from aqueous solutions), flocculating agents, application in chromatography, molecular sieves, application in cosmetics (for example for shampoos, toothpaste, hair sprays, nail varnish etc.), application in fungicides (for example in agriculture), use in immunology, in biochemistry (for example for the immobilization or separation of enzymes) and in medicine, as well as in medical equipment.

The following examples are provided for illustrative purposes and are not intended to limit the scope of the invention.

The deacetylation of chitin in Examples 1-19 was conducted using the following process steps:

(1) 300 ml of the oil indicated in Table A was heated to 93.3° C. (200° F.);

(2) 40 grams of crab shell chitin (DDA=6.5%) was added to the oil and the stirring continued.

(3) The amount of sodium hydroxide (beads), water, and/or 50% by weight sodium hydroxide solution (S.G.=1.53) indicated in Table A was added and the stirrer speed was increased as the chitin began to swell;

(4) The mixture was heated at 93.3° C. (200° F.) unless otherwise indicated for the time indicated in Table A.

(5) The contents of the beaker were then drained over a 200 mesh screen and the volume of oil recovered was measured (indicated as RO #1 in Table A).

(6) The oil wet deacetylated chitin/NaOH mixture was then placed in a large volume of water and hand stirred to separate the remaining oil from the deacetylated chitin, the oil siphoned off, and the volume of oil recovered was measured (indicated as RO #2 in Table A);

(7) The deacetylated chitin was then washed thoroughly to remove the excess sodium hydroxide followed by drying at 82.2° C. (180° F.) for 24 hours.

The degree of deacetylation of the chitin was determined as follows:

Determining Percent Deacetylation of Chitosan by Direct Titration

A. Materials and Equipment:
  1. Hydrochloric solution: 0.06 N
  2. Sodium Hydroxide solution: 0.1000N
  3. Distilled water.
  4. A calibrated pH meter Note: MUST BE CALIBRATED DAILY
  5. 300 mL Beaker
  6. 25 mL Buret (increments of 0.1 mL)
  7. Glass Pipet (10 or 25 ml)
  8. Magnetic Stir Plate
  9. Magnetic Stir Bars
  10. Balance weighing in grams (readable to at least 2 decimal places)

B. Procedure:
  1. Using a glass pipet, transfer 25.0 mL of 0.06 N HCl into a glass beaker.
  2. Add 0.10 g of moisture corrected chitosan and stir on magnetic stir plate for 2 hours. (NOTE: To determine moisture correction, take (0.10 g)(% moisture)÷100, then add that result to 0.10 g.)
  3. After 2 hours, pipet 25.0 mL of distilled water into the beaker and stir for an additional 10-15 minutes.
  4. After 10-15 minutes, place the calibrated pH probe into the beaker and record the initial pH of the solution.
  5. Fill the 25.0 mL Buret with 0.1000 N Sodium Hydroxide (making sure to remove any air bubbles from buret, which could affect the results).
  6. While continuing to stir the solution, carefully titrate with the 0.1000 N NaOH solution to a pH of 3.75—record this as V1 (volume 1).
  NOTE: Carefully titrate in small increments while recording the volume used and the pH after each addition of NaOH solution.
  7. Continue titrating to a pH of 8.00—record this as V2 (volume 2).
  8. Run each sample in duplicate or triplicate if necessary (Triplicate run is required if the difference numerically between results is greater than 5).

C. Calculations
  A. Calculating V1 and V2
  NOTE: If the pH of 3.75 or 8.00 falls in between 2 amounts of titrant used, use the following formula to calculate the exact amount that would have been used to achieve either 3.75 or 8.00.

$$f(x) = f(X_0) + \frac{[f(X_1) - f(X_0)]}{(X_1 - X_0)}(X - X_0)$$

Where, $f(X_0)$=the amount of titrant used immediately prior to achieving pH of 3.75 or 8.00.

$f(X_1)$=the amount of titrant used immediately after achieving pH of 3.75 or 8.00.

X=3.75 or 8.00, depending on which pH is being calculated.

$X_0$=the pH value prior to getting 3.75 or 8.00.
$X_1$=the next pH value that is higher than 3.75 or 8.00.

B. Calculating the % Deacetylation
The following formula is used to calculate the percent deacetylation:

%$DA=[(V2-V1)*16116*N\ NaOH)]/$mg of chitosan

NOTE: N NaOH=0.1000
mg of chitosan=100

C. Calculations:

Moisture Corrected Chitosan=(% moisture)(Chitosan, g)÷100+(Chitosan, g)

The non-saponifiable, non-aromatic hydrocarbon liquids evaluated in the examples are as follows: OIL A=HT 100 Paraffinic Process Oil available from Expo Chemical Company, Inc., 6807 Theall Road, Ste. A, Houston, Tex. 77066; OIL B=Pure Performance® Base Oil 80N available from Conoco Phillips, P.O. Box 2197, Houston, Tex. 77252; OIL C=Vassa LP90 available from Vassa Asocietes Y Solventes Venezuelanos S. A., Torre Pequiven, Piso-1, Av Francisco de Miranda, Chacao, Caracas, Venezuela; OIL D=Conoco 110 available from Conoco Phillips, P.O. Box 2197, Houston, Tex. 77252.

Set forth in Table A are the process conditions and results obtained for nineteen examples of the invention. The data indicate that the characteristics of the NSNAL, the concentration of the AMHS, the quantity of the AMHS, and the reaction temperature all influence the characteristics of the deacetylated chitin obtained, and that the NSNAL is easily recovered for re-use.

TABLE A

| Example Number | Oil | ml 50% NaOH | g NaOH | ml H₂0 | Hr At Temp. | ml RO#1 | ml RO#2 | Ave % DA |
|---|---|---|---|---|---|---|---|---|
| 1 | A | 20 | — | — | 2 | — | — | 20 |
| 2 | A | 20 | — | — | 4$^{(1)}$ | 200 | 100 | 22 |
| 3 | A | 20 | — | — | 2$^{(1)}$ | 200 | 80 | 25 |
| 4 | A | — | 20 | 20 | 2 | 180 | 120 | 29 |
| 5 | A | — | 20 | 20 | 2 | 150 | 150 | 32 |
| 6 | A | — | 20 | 5 | 2 | 200 | 100 | 38 |
| 7 | A | — | 20 | 10 | 2 | 180 | 120 | 49 |
| 8 | A | 40 | — | — | 2 | 200 | 100 | 55 |
| 9 | A | 40 | — | — | 4$^{(2)}$ | 200 | 100 | 63 |
| 10 | A | 80 | — | — | 2 | — | — | 70 |
| 11 | B | 80 | — | 40 | 2 | 260 | — | 36 |
| 12 | B | 20 | — | — | 2 | 225 | 75 | 40 |
| 13 | B | 20 | — | — | 4 | 225 | 75 | 55 |
| 14 | B | 80 | — | — | 2 | 260 | 40 | 79 |
| 15 | B | 40 | — | — | 2$^{(3)}$ | 230 | 70 | 79 |
| 16 | B | 40 | — | — | 3$^{(3)}$ | 180 | 120 | 80 |
| 17 | B | 80 | — | — | 4 | 245 | 55 | 82 |
| 18 | C | 20 | — | — | 2 | — | — | 30 |
| 19 | C | 20 | — | — | 2 | 200 | 80 | 25 |
| 20 | D | 66 | — | — | 2$^{(4)}$ | — | — | 63 |
| 21 | D | 90 | — | — | 2$^{(4)}$ | — | — | 62 |
| 22 | D | 66 | — | — | 2$^{(4)}$ | — | — | 69 |

$^{(1)}$85 ± 2.8° C. (185 ± 5° F.);
$^{(2)}$87.8 ± 2.8° C. (190 ± 5° F.);
$^{(3)}$98.9° C. (210° F.);
$^{(4)}$82.2° C. (180° F.)

EXAMPLE 20-22

Shrimp shell chitin was deacetylated as in Examples 1-19 except that there were used 1000 cc of Conoco 110N oil; 22 grams of chitin in Examples 20 and 22 and 30 grams of chitin in Example 21; and 66 cc of 50% sodium hydroxide in Examples 20 and 22 and 90 cc of 50% sodium hydroxide in Example 21. In Example 20, the caustic solution was added before the chitin. The reaction temperature was 82.2° C. (180° F.) and the reaction time was 2 hours. The DDA of the deacetylated chitin obtained is set forth in Table A.

EXAMPLE 23

The process of obtaining chitin from a chitinaceous material and the deacetylation of the chitin obtained is set forth in the following examples. The chitinaceous material utilized was ground shrimp shell.
1) Heat 300 ml of OIL A to 87.8° C. (190° F.);
2) Add 40 grams of shrimp shell and stir to keep the shell suspended;
3) Add 50 ml of 15% by weight HCl in 10 ml increments, allowing the generated foam to subside between additions;
4) Age overnight at ambient temperature;
5) Prepare a 50% caustic (NaOH) solution and heat to 93.3° C. (200° F.);
6) Heat the demineralized shell/oil mixture from step (4) to 93.3° C. (200° F.);
7) Add 40 ml of the heated 50% caustic solution while continuing stirring. Increase the mixer speed as necessary to maintain the demineralized chitin/caustic solution in suspension;
8) Mix for 2 hours;
9) Drain over a 200 mesh screen and measure the volume of oil recovered –240 ml;
10) Pour the drained oil wet deacetylated chitin into a large volume of water and hand stir to separate the remaining oil from the deacetylated chitin. Siphon off the oil layer and measure the volume of oil recovered –40 ml;
11) Wash the deacetylated chitin to remove the excess sodium hydroxide and water soluble by-products; and
12) Dry at 82.2° C. (180° F.) for 24 hours.

The DDA of the deacetylated chitin was determined to be 43%.

EXAMPLE 24

Shrimp shell chitin was deacetylated as in Examples 20-22 except that there were used 3500 cc of Oil D; 95 grams of chitin; and 285 cc of 50% by weight sodium hydroxide. The reaction temperature was 82.2° C. (180° F.). Samples of the deacetylated chitin were removed after 1, 1.5, 2, 2.5 and 3 hours and the DDA determined for each. The percent deacetylation was 49.8%, 54.5%, 56.9%, 56.8%, and 61.0%, respectively.

What is claimed is:
1. A process for the deacetylation of chitin comprising suspending chitin in a non-saponifiable, non-aqueous, water insoluble liquid having a flash point greater than about 100° C., adding thereto and mixing therewith a saponification reactant selected from the group consisting of (1) an alkali metal hydroxide solution, (2) water and an alkali metal hydroxide to form an alkali metal hydroxide solution in-situ, and (3) mixtures thereof, and thereafter heating the suspension to a temperature and for a time period sufficient to deacetylate the chitin to the desired degree of deacetylation.
2. The process of claim 1 wherein the concentration of the alkali metal hydroxide in the alkali metal hydroxide solution is at least 30% by weight and wherein the quantity of the alkali metal hydroxide is sufficient to provide an alkali metal hydroxide to chitin weight ratio from about [(0.35)(AM-

HMW)÷40] to about [(2.5)(AMHMW)÷40] where (AMHMW) is the molecular weight of the alkali metal hydroxide.

3. The process of claim 2 wherein the concentration of the alkali metal hydroxide in the alkali metal hydroxide solution is at least 40% by weight.

4. The process of claim 2 wherein the concentration of the alkali metal hydroxide in the alkali metal hydroxide solution is at least about 50% by weight.

5. The process of claim 1, 2, 3, or 4 wherein the quantity of chitin is from about 0.02 to about 0.2 grams per cubic centimeter of the non-saponifiable, non-aqueous, water insoluble liquid, wherein the temperature is at least about 70° C., and wherein the degree of deacetylation is from about 15% to about 100%.

6. The process of claim 1, 2, 3, or 4 wherein the quantity of chitin is from about 0.02 to about 0.2 grams per cubic centimeter of the non-saponifiable, non-aqueous, water insoluble liquid, wherein the temperature is at least about 80° C., and wherein the degree of deacetylation is from about 15% to about 95%.

7. The process of claim 1, 2, 3, or 4 wherein the quantity of chitin is from about 0.02 to about 0.2 grams per cubic centimeter of the non-saponifiable, non-aqueous, water insoluble liquid, wherein the temperature is at least about 85° C., and wherein the degree of deacetylation is from about 20% to about 90%.

8. The process of claim 5 wherein the non-saponifiable, non-aqueous, water insoluble liquid is a non-aromatic hydrocarbon which is liquid at the reaction temperature.

9. The process of claim 6 wherein the non-saponifiable, non-aqueous, water insoluble liquid is a non-aromatic hydrocarbon which is liquid at the reaction temperature.

10. The process of claim 7 wherein the non-saponifiable, non-aqueous, water insoluble liquid is a non-aromatic hydrocarbon which is liquid at the reaction temperature.

11. The process of claim 5 wherein the non-saponifiable, non-aqueous, water insoluble liquid is selected from the group consisting of paraffinic hydrocarbons, olefinic hydrocarbons, alcohols containing more than about eight carbon atoms, polypropylene glycols, propylene glycol ethers, butylene glycol ethers, and silicone oils, which is liquid at the reaction temperature.

12. The process of claim 6 wherein the non-saponifiable, non-aqueous, water insoluble liquid is selected from the group consisting of paraffinic hydrocarbons, olefinic hydrocarbons, alcohols containing more than about eight carbon atoms, polypropylene glycols, propylene glycol ethers, butylene glycol ethers, and silicone oils, which is liquid at the reaction temperature.

13. The process of claim 7 wherein the non-saponifiable, non-aqueous, water insoluble liquid is selected from the group consisting of paraffinic hydrocarbons, olefinic hydrocarbons, alcohols containing more than about eight carbon atoms, polypropylene glycols, propylene glycol ethers, butylene glycol ethers, and silicone oils, which is liquid at the reaction temperature.

* * * * *